(12) United States Patent  
Chang

(10) Patent No.: US 7,593,145 B2
(45) Date of Patent: Sep. 22, 2009

(54) CHASSIS SHOCK LOCKUP APPARATUS FOR AN IMAGE SCANNING DEVICE

(75) Inventor: Yulun Chang, Miaoli County (TW)

(73) Assignee: Avision Inc. (TW)

( * ) Notice: Subject to any disclaimer, the term of this patent is extended or adjusted under 35 U.S.C. 154(b) by 788 days.

(21) Appl. No.: 11/343,611

(22) Filed: Jan. 30, 2006

(65) Prior Publication Data

US 2006/0176523 A1 Aug. 10, 2006

(30) Foreign Application Priority Data

Feb. 4, 2005 (TW) ............................. 94103758 A

(51) Int. Cl.
*H04N 1/04* (2006.01)
(52) U.S. Cl. ................... 358/474; 250/234; 359/340; 359/702
(58) Field of Classification Search ................ None
See application file for complete search history.

(56) References Cited

U.S. PATENT DOCUMENTS

| 5,638,919 | A * | 6/1997 | Pejout | 182/192 |
|---|---|---|---|---|
| 6,476,373 | B1 * | 11/2002 | Gilpin | 250/208.1 |
| 6,937,368 | B2 * | 8/2005 | Liu | 358/474 |
| 7,068,401 | B2 * | 6/2006 | Johnson et al. | 358/474 |
| 7,268,922 | B2 * | 9/2007 | Hsu | 358/474 |
| 7,304,773 | B2 * | 12/2007 | Lee et al. | 358/474 |
| 2003/0231357 | A1 * | 12/2003 | Johnson et al. | 358/484 |
| 2004/0150862 | A1 * | 8/2004 | White et al. | 358/474 |
| 2005/0094217 | A1 * | 5/2005 | Molchan et al. | 358/474 |
| 2006/0061832 | A1 * | 3/2006 | Ferguson et al. | 358/474 |
| 2007/0058215 | A1 * | 3/2007 | Won | 358/474 |

* cited by examiner

*Primary Examiner*—Mark K Zimmerman
*Assistant Examiner*—Dung D Tran

(57) ABSTRACT

A shock lockup apparatus is mounted on the chassis of an image scanning device includes a stopping block and a lockup module, with part of the transmission belt driving the chassis of the image scanning device being placed in between. In such a manner, when the image scanning device is being moved and the chassis receives shock or momentum, then the locking unit of the lockup module will move toward the stopping block to clip the transmission belt and fix the chassis synchronously.

22 Claims, 10 Drawing Sheets

CHASSIS SHOCK LOCKUP APPARATUS FOR AN IMAGE SCANNING DEVICE

BACKGROUND OF THE INVENTION

1. Field of the Invention

The present invention relates to a shock lockup apparatus which is mounted with an image scanning device, such as flatbed scanner, scanner with ADF and copy machine. When the chassis of the image scanning device receives momentum, such as when being moved or shaken, by fixing the transmission belt driving the chassis, the lockup apparatus is able to prevent the chassis from shock and colliding with embedded and surrounding parts and accessories, so as to maintain the quality of the scanning job.

2. Description of the Prior Art

An image scanning device, such as a scanner or copy machine, is primarily composed of a transparent scanning window set on top of a housing which includes a chassis, at least one guiding rod and a transmission system to drive the chassis. When the transmission system operates to drive the chassis back and forth along the guiding rod, the chassis will scan a document and produce a corresponding image data.

Due to the chassis being able to move back and forth, it may generate shock or collide with the guiding rod when moving the image scanning device. Such sudden shock or collision may change the relative positions of the parts assembled in and around the chassis, or the chassis cause a deflection from the guiding rod. Therefore the scanning image resulted in lower quality.

Some existing image scanning devices are equipped with a manual lockup device to fix the chassis in the original position. Before moving the scanning device, the user must remember to operate the lockup system to prevent the chassis from generating sudden shock or collision with the guiding rod.

Once the user forgets to lock the lockup device, the chassis will to cause shock and collision with the guiding rod during the scanning device is moved. Therefore an automatic shock lockup device is necessary for a high precision scanning device.

SUMMARY OF THE INVENTION

An object of this invention is to provide an automatic shock lockup apparatus for the chassis of a scanning device. When moving the scanning device, the automatic shock lockup apparatus lock the chassis in the original position automatically by inertia, so as to prevent the chassis from generating sudden shock or collision.

The shock lockup apparatus includes a stopping block and a lockup module, and the shock lockup apparatus is mounted at the bottom surface of the chassis of the scanning device. The stopping block has at least two saliencies, and the stopping block opposite to the lockup module. A transmission belt situate between the lockup module and stopping block for driving the chassis.

When the chassis receives external force and generates shock, by inertia, the lockup module will move toward the stopping block and clip the transmission belt to the stopping block. The lockup module cooperate with the stopping block not only clips the transmission belt, but also prevents the chassis from collision with other parts and accessories.

According to the descriptions above, the present invention has the following benefits and advantages:

1) The lockup module and the stopping block are respectively set at the two sides of the transmission belt; when the chassis receives external force and generates sudden shock, by inertia, either one end of the lockup module will push the transmission belt toward the stopping block. In such a way, the cooperation of the lockup module and the stopping block will automatically clip the transmission belt in time, preventing the chassis and other parts and accessories from damage. When the external force disappears, the shock lockup status will be relieved by itself.

2) The present invention gets rid of the inconvenience of manual operation. When the user moves the image scanning device, the shock lockup apparatus will synchronously fixate the chassis, providing the user with greater convenience and more thorough protection for the chassis.

DETAILED DESCRIPTION OF THE PREFERRED EMBODIMENTS OF THE INVENTION

Figure 1:
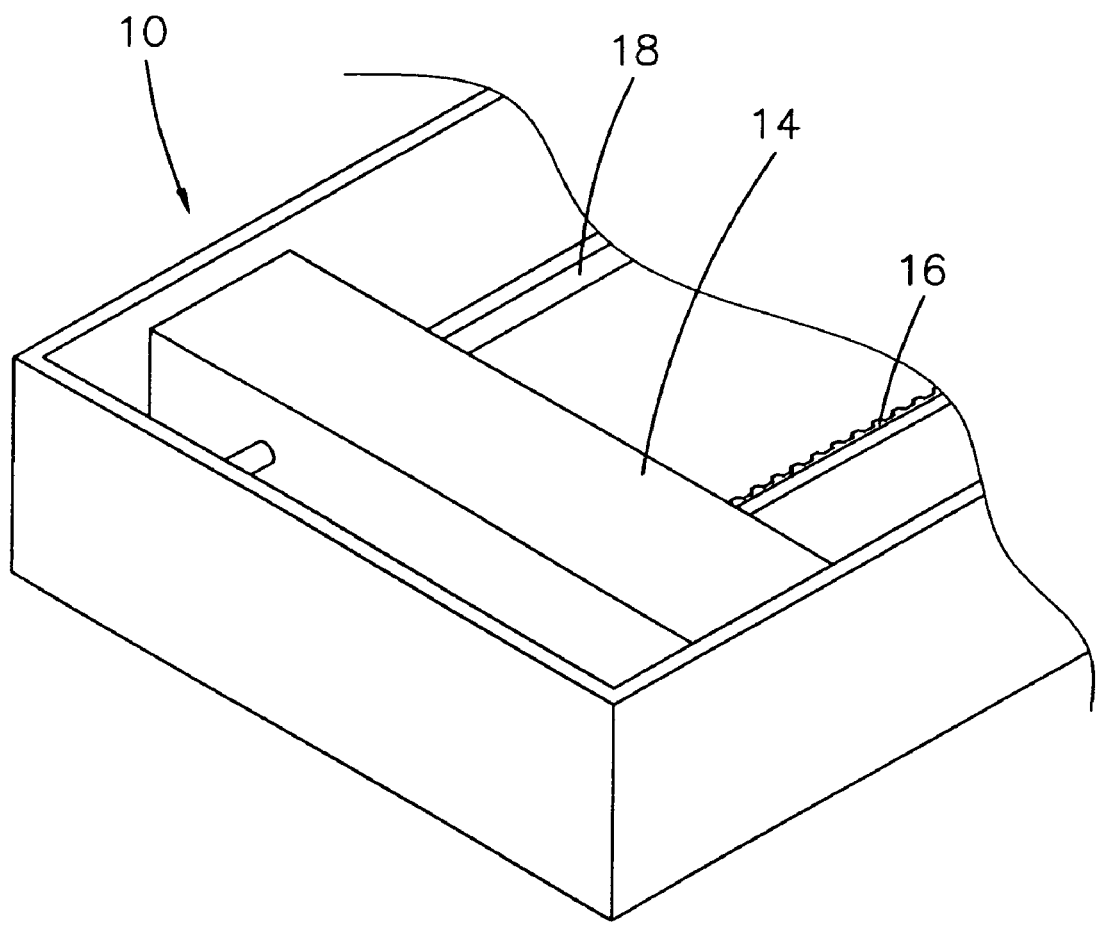
FIG. 1 is a portion pictorial view of the chassis within the lower housing of the prior art.

Referring to FIG. 1, a scanner 10 includes a lower housing 12, a chassis 14, a transmission belt 16 and a guiding rod 18. A light source, a plurality of reflecting mirrors and an image sensor are mounted in the chassis 14, and the chassis is mounted in the lower housing 12. A transmission belt 16 which connects with the chassis 14 and drive the chassis 14 to move back and forth along a guiding rod 18.

Figure 2:
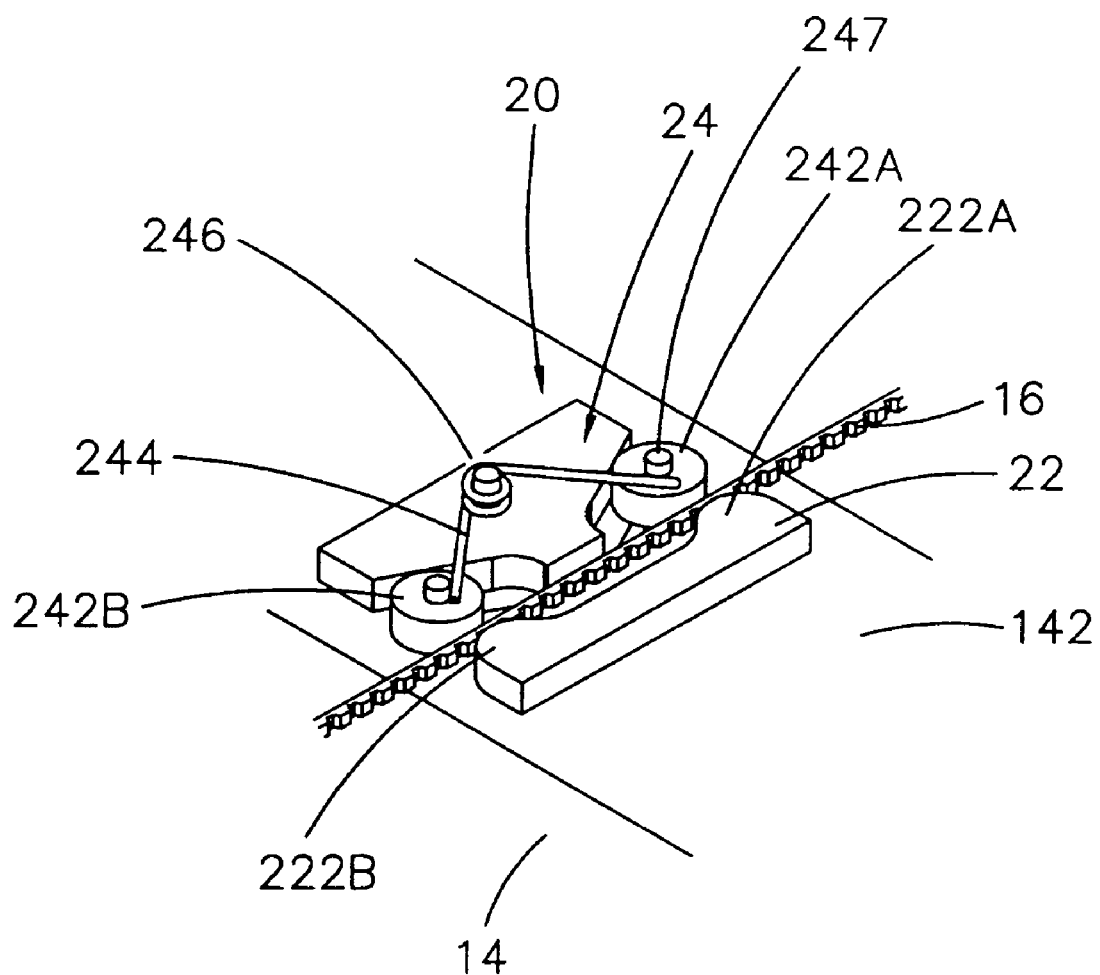
FIG. 2 is a perspective view of the present invention.
Figure 3:
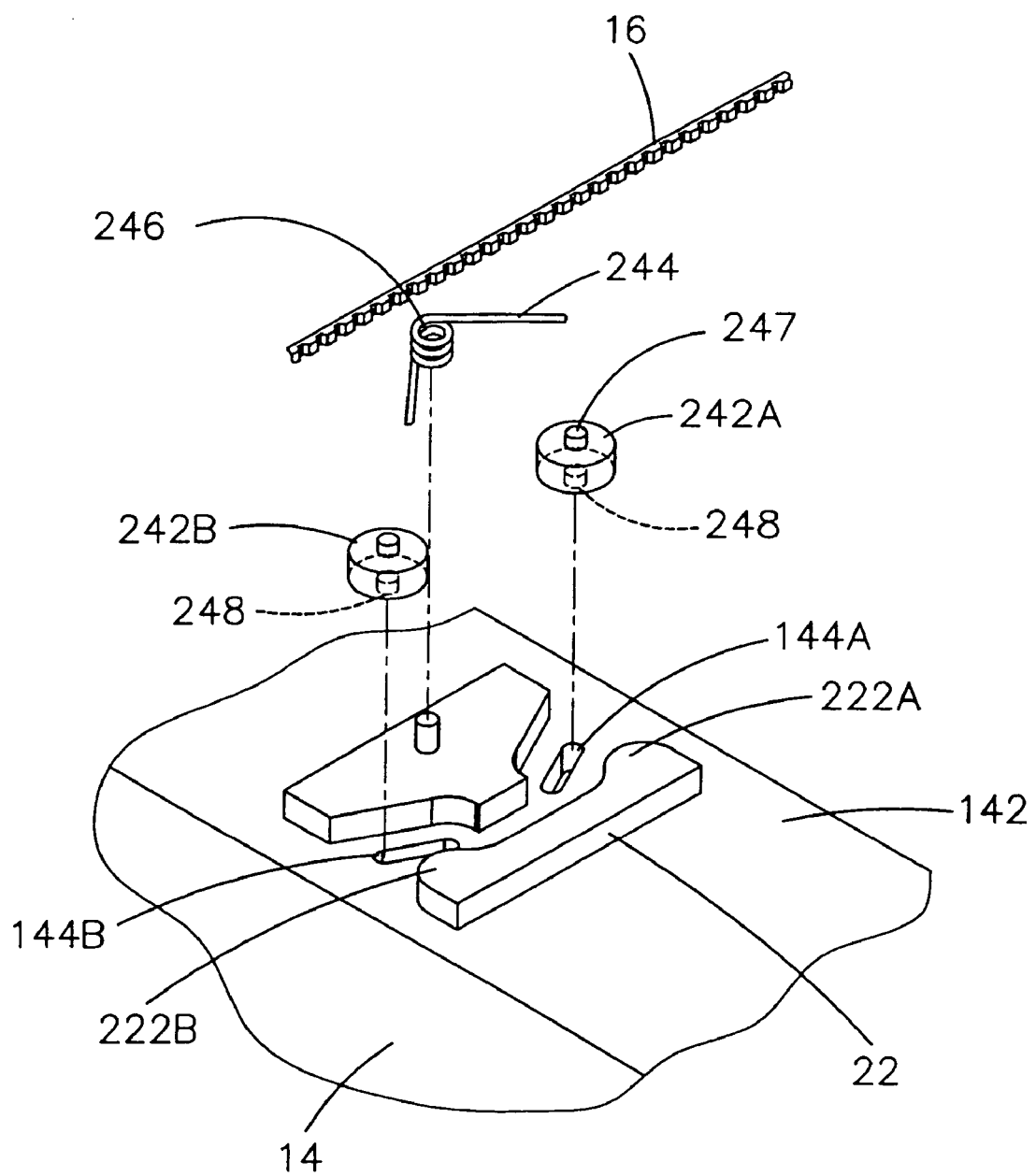
FIG. 3 is a perspective exploded view of the present invention.

Referring to FIGS. 2 and 3, a chassis shock lockup apparatus 20 is mounted at the outside bottom surface 142 of the chassis 14. The chassis shock lockup apparatus 20 includes a stopping block 22 and a lockup module 24. The stopping block 22 is mounted at the outside bottom surface 142 of the chassis 14. One side of the stopping block 22 having two saliencies 222A and 222B which are opposite to one side of the transmission belt 16.

The lockup module 24 is placed at the other side of the transmission belt 16. The lockup module 24 includes a lockup unit and an elastic component. The lockup unit comprises two rollers 242A and 242B, while the elastic component is a torsion spring 244. The center 246 of the torsion spring 244 is pivoted on the outside bottom surface 142 of the chassis 14, so that the two arms of the torsion spring 244 can function like leverage. Two rollers 242A and 242B are assembled with the two arms' ends of the torsion spring 244 respectively, and the rollers 242A and 242B are opposite to the stopping block 22. Two curved grooves 144A and 144B are formed at the bottom surface 142 of the chassis 14, with the guiding pin 248 of the rollers 242A and 242B properly installed in the grooves 144A and 144B. In such a way, the rollers 242A and 242B will move along the anticipated trajectory by the mechanism of the guiding pin 248 and the grooves 144A and 144B.

Figure 4:
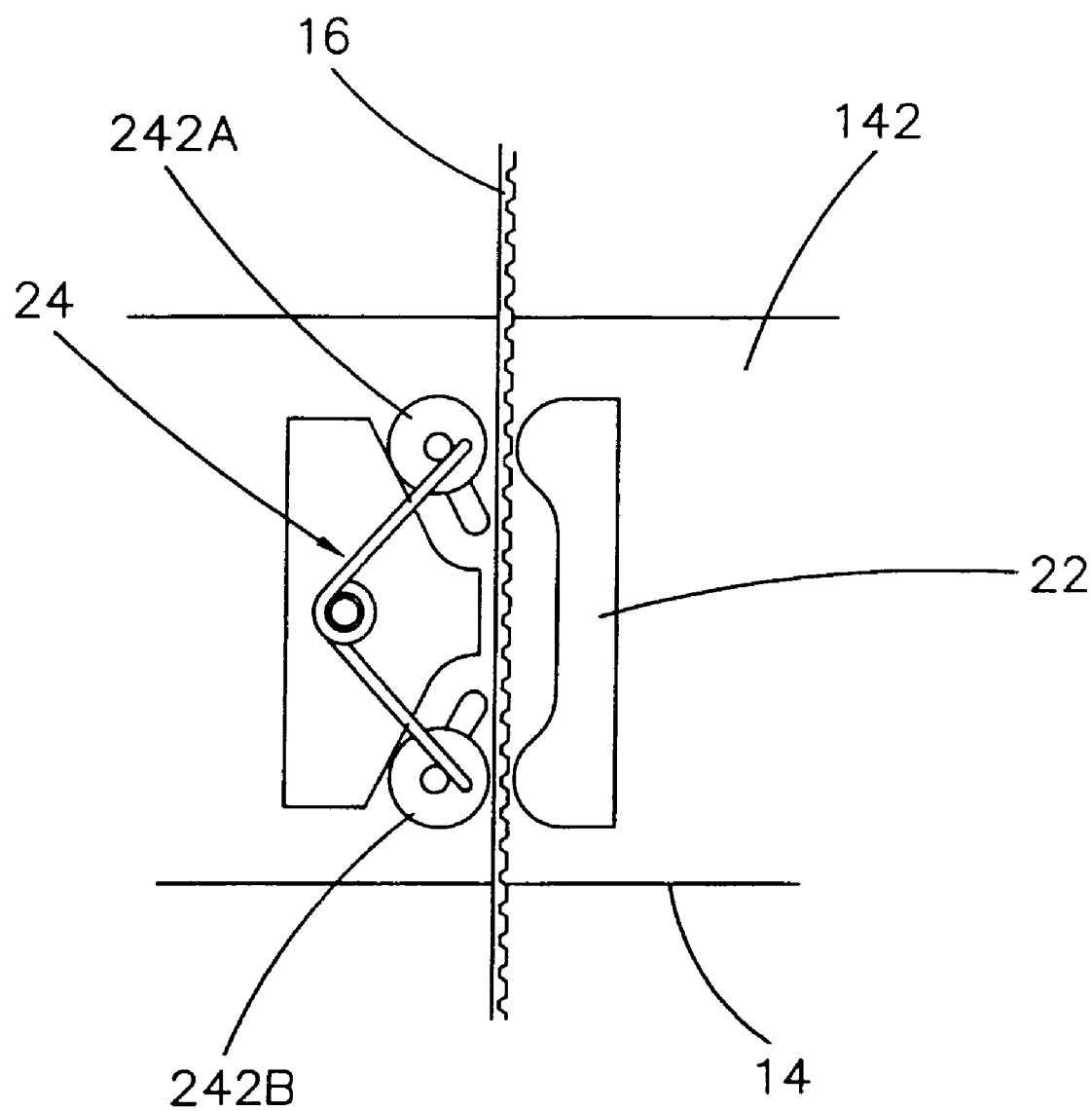
FIG. 4 is a schematic view of the present invention.

Referring to FIG. 4, the stopping block 22 and the lockup module 24 are both mounted at the outside bottom surface 142 of the chassis 14, with the transmission belt 16 being placed between the stopping block 22 and the rollers 242A and 242B. When the scanner receives no external force, the rollers 242A and 242B, the transmission belt 16 and the stopping block 22 will not contact one another.

Figure 5:
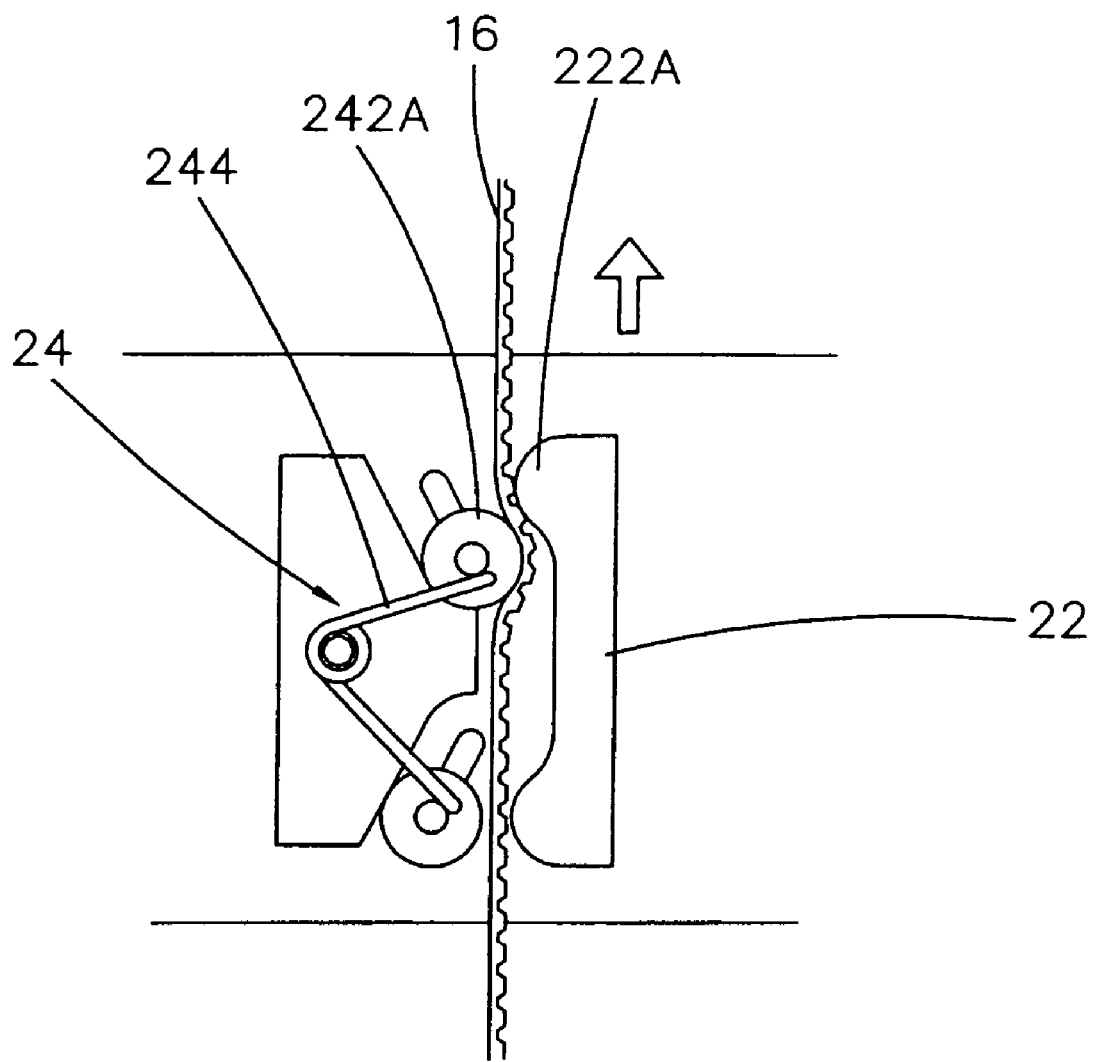
FIG. 5 is a top view of the present invention in use.

Referring to FIG. 5, when moving the scanner and generating momentum as shown by the arrow, the rollers 242A of the lockup module 24 will move correspondingly to the stopping block 22 by means of inertia, and the torsion spring 244 will deform to generate elastic resilience. At the same time, the roller 242A will push the transmission belt 16 toward the stopping block 22. Because the axle 247 of the roller 242A is rested on the end of the torsion spring 244, the roller 242A can rotate and cross over the salient 222A of the stopping block 22. Therefore, the transmission belt 16 is nipped and stopped by the roller 242A and the salient 222A, and the chassis 14 which connected to the transmission belt 16 is fixated.

When the momentum disappears, the resilience of the torsion spring 244 draws the roller 242A back to its original position and the transmission belt 16 and the chassis 14 can move again.

Figure 6:
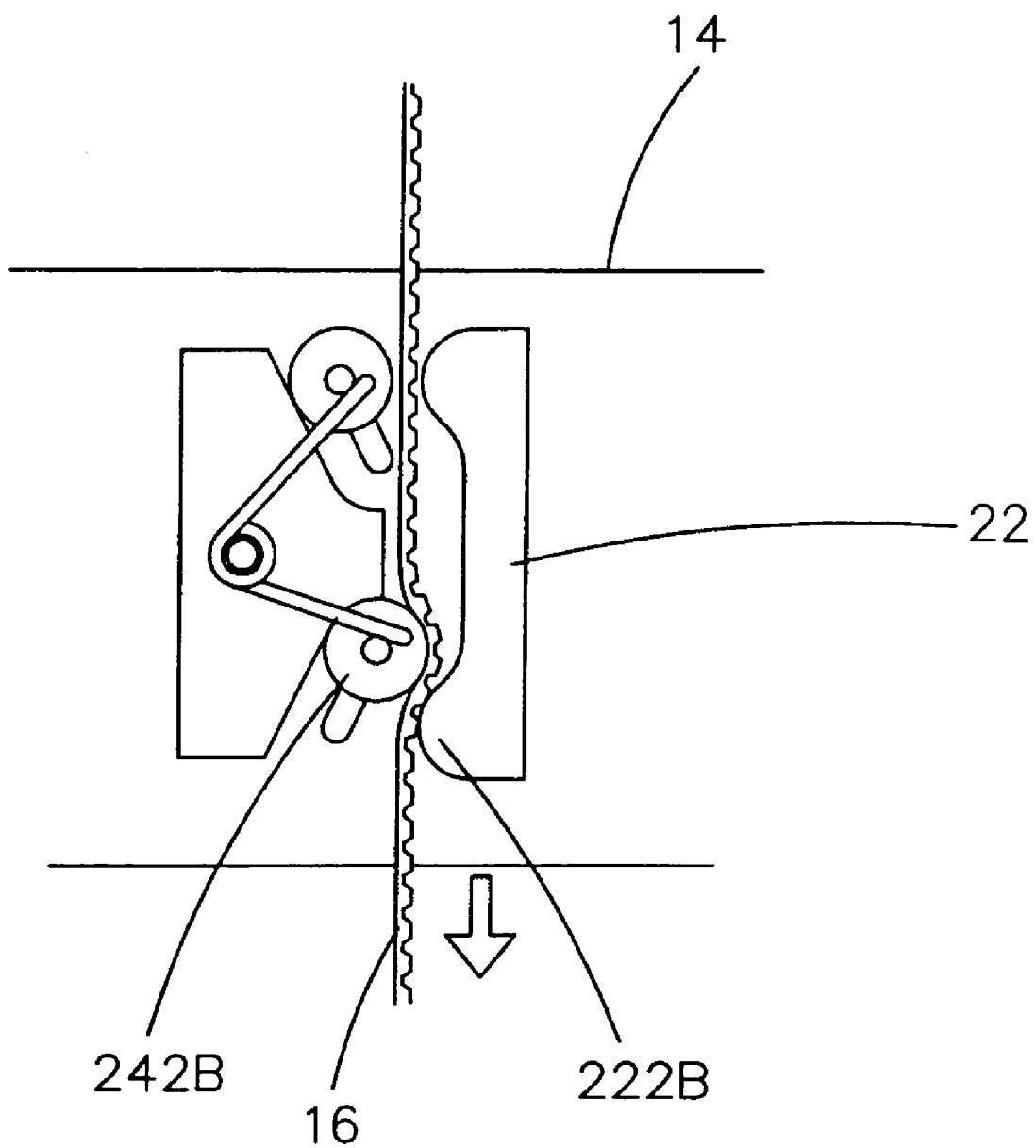
FIG. 6 is a top view of the present invention in use.

Referring to FIG. 6, when momentum is generated in the direction as shown by the arrow, the chassis shock lockup apparatus functions by the same principle. The roller 242B can rotate and cross over the salient 222B of the stopping block 22, and the transmission belt 16 is nipped and stopped by the roller 242A and the salient 222A. Therefore the chassis 14 which connected to the transmission belt 16 is fixated.

Figure 7:
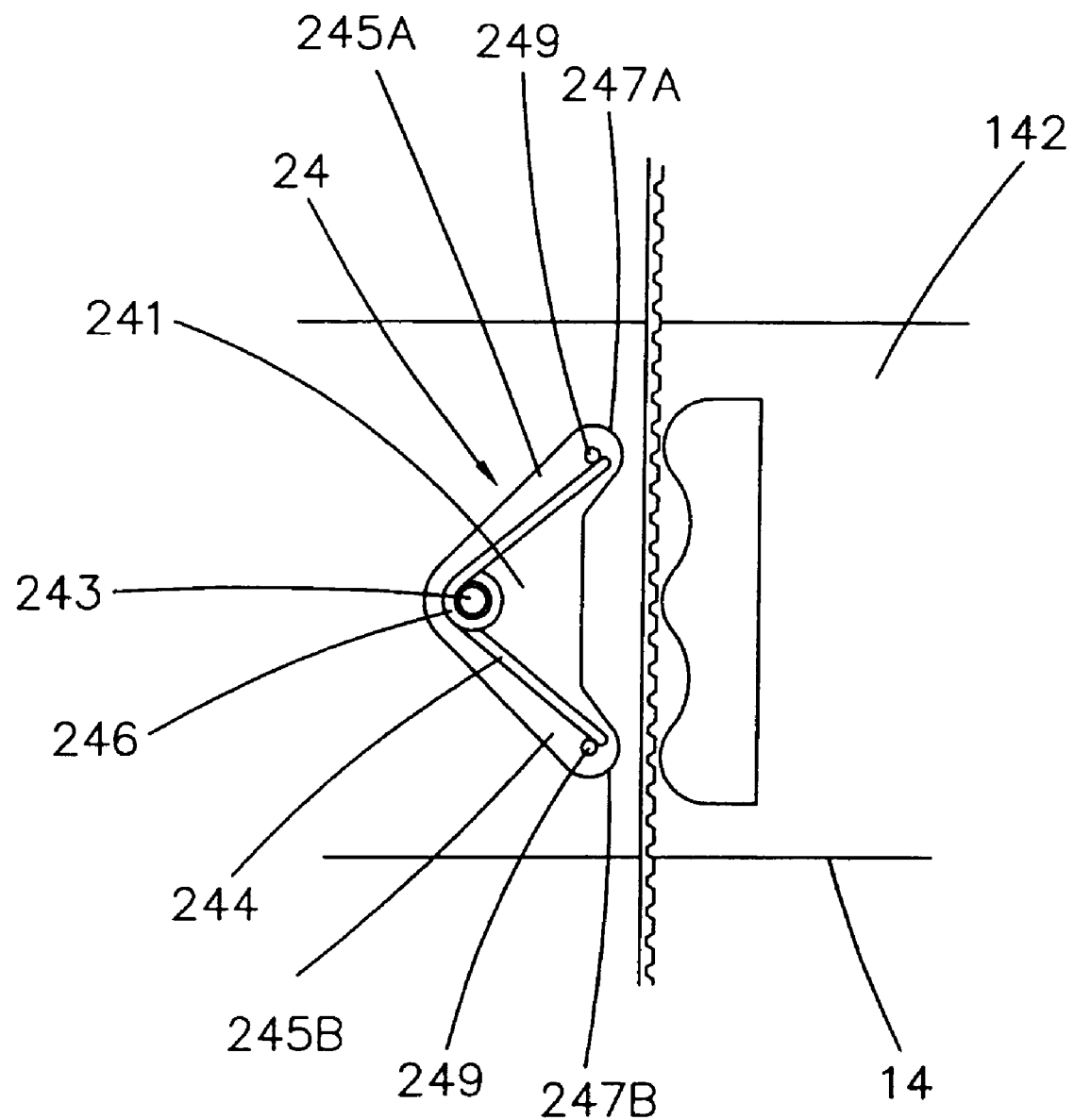
FIG. 7 is a schematic view of another embodiment of the present invention.

Referring to FIG. 7, another type of the lockup module 24 is composed of a swaying block 241 and a torsion spring 244. The swaying block 241 is formed V-shaped. The pivot position 243 of the swaying 241 corresponds with the center 246 of the torsion spring 244. The pivot position 243 is pivoted on the outside bottom surface 142 of the chassis 14. The center 246 of the torsion spring 244 is mounted on the pivot position 243.

The V-shaped swaying block 241 has two extending arms 245A and 245B, with their respective locking ends 247A and 247B as shown. Both the locking ends 247A and 247B have outstanding rods 249 rested upon the ends of the torsion spring 244 as shown.

As the previous embodiment, the swaying block 241 has a guiding pin (not shown) installed in the groove of the bottom surface 142 of the chassis 14.

Figure 8:
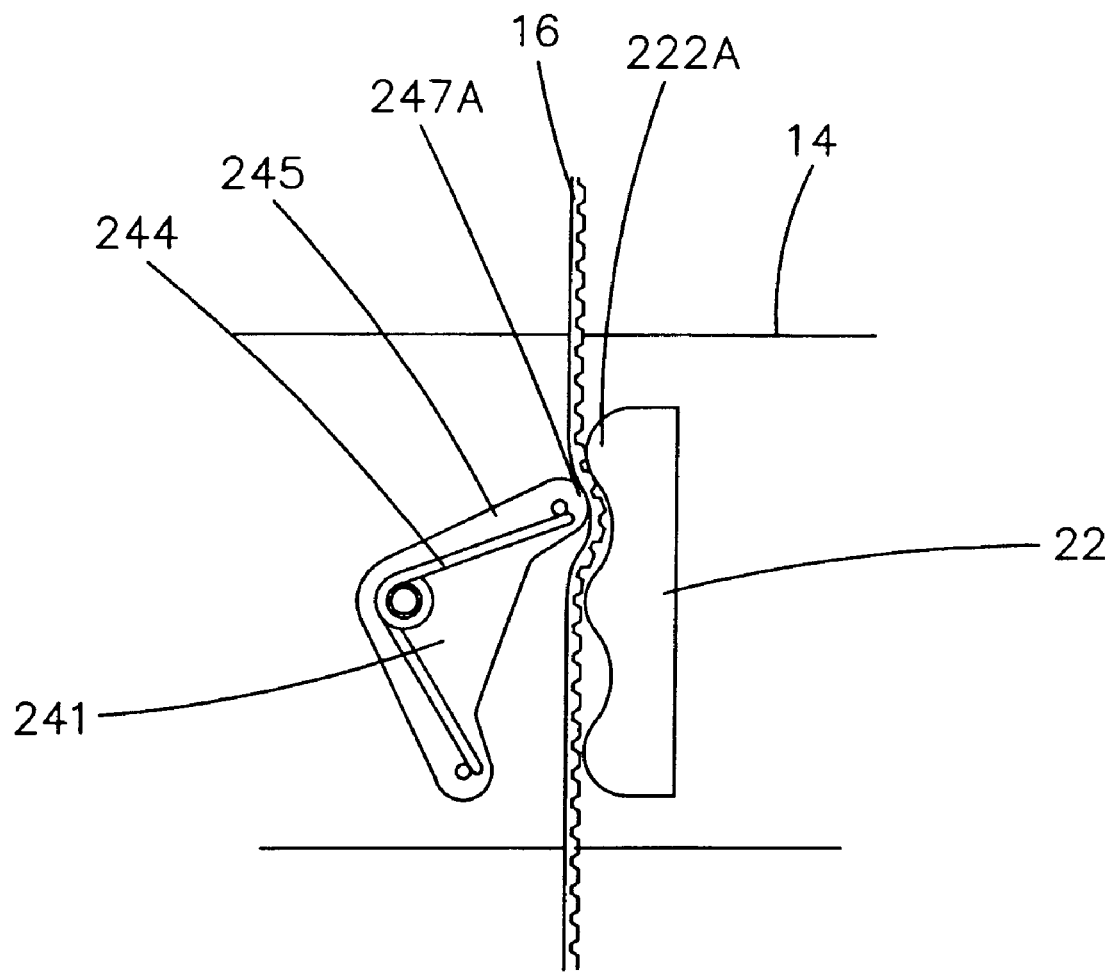
FIG. 8 is a top view of the present invention in use as shown in FIG. 7.

Referring to FIG. 8, when the chassis 14 receives momentum, by means of inertia, the extending arm 245A of the swaying block 241 will move toward the stopping block 22 to push one end of the torsion spring 244 and the locking end 247A and the salient 222A will nip the transmission belt 16. In such a manner, the chassis 14 can be fixated.

When the momentum disappears, the resilience of the torsion spring 244 will drive the swaying block 241 back to the original status.

Figure 9:
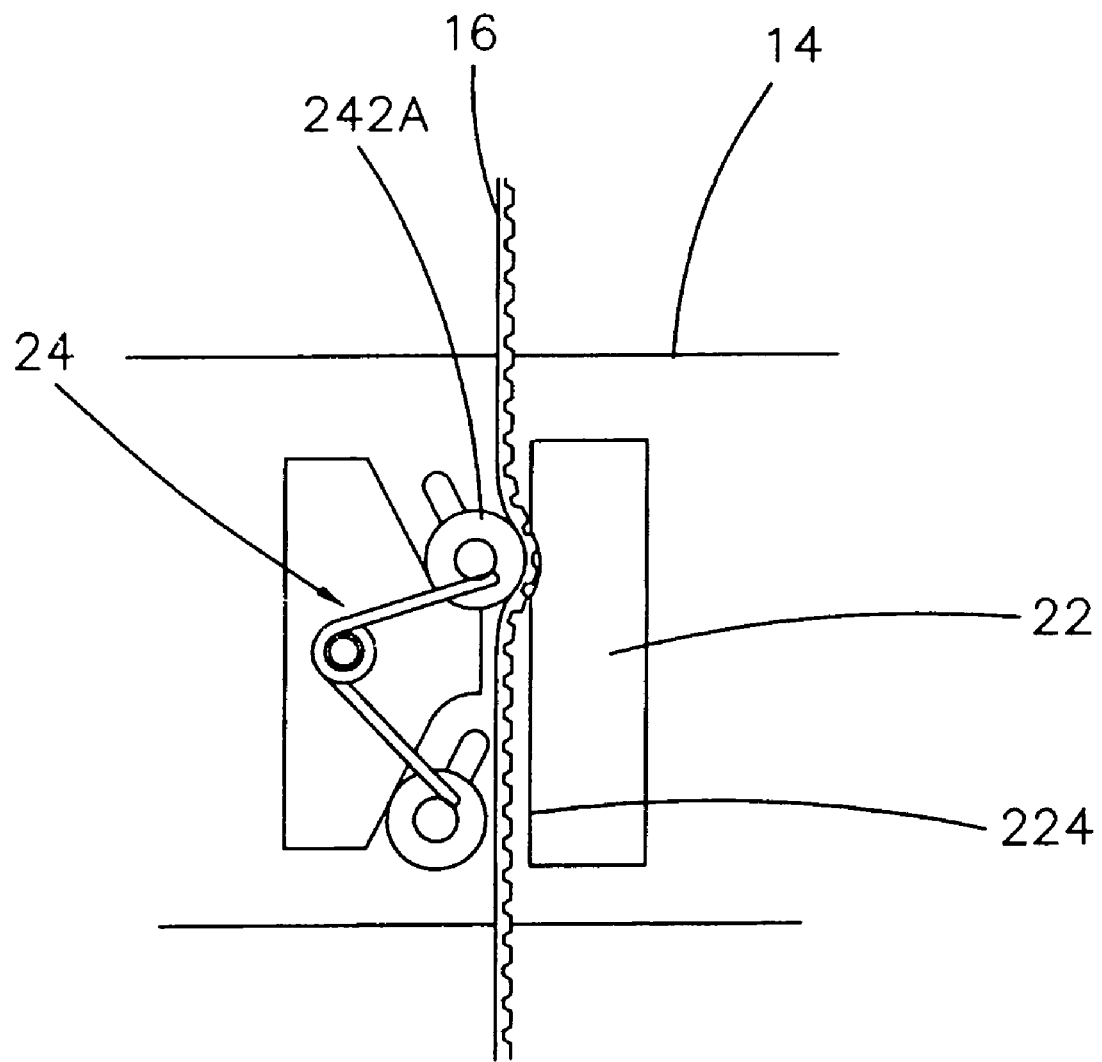
FIG. 9 is a schematic view of the present invention in use.
Figure 10:
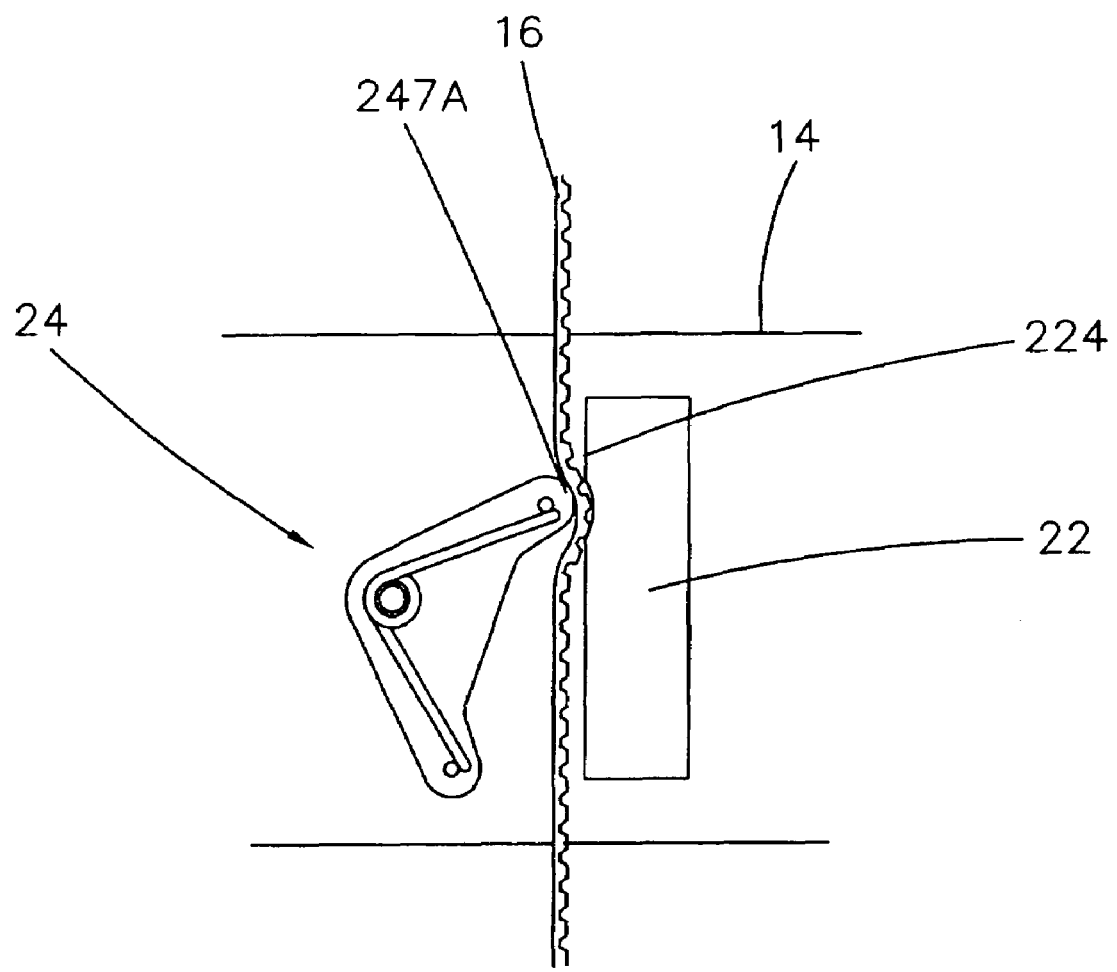
FIG. 10 is a schematic view of the present invention in use.

Referring to FIGS. 9 and 10, a lateral side 224 of the stopping block 22 does not have any salient formation, and the lateral side 224 is opposite to the transmission belt 16 and the lockup module 24. When the chassis 14 receives momentum, one end of the lockup module 24 will push the transmission belt 16; in such a manner, the roller 242A or the locking end 247A cooperate with the lateral side 224 of the swaying block 22 for nipping the transmission belt 16.

It requires that the nipping action should not damage the surface of the transmission belt 16. Therefore, among the stopping block 22, the rollers 242A and 242B, and the locking ends 247A and 247B, at least one of them should be made of soft material, such as rubber and sponge alike.

Take the example of the stopping block 22 being made of soft material. When the chassis 14 receives momentum, the roller 242A or 242B will push the transmission belt 16 toward the soft lateral side 224 of the stopping block 22. In such mechanism, the soft lateral side 224 of the stopping block 22 forms a temporary concave to catch the transmission belt 16 securely with the roller 242A or 242B. The same mechanism can be applied in the embodiment of the locking end 247A or 247B and the stopping block 22.

The invention makes use of the momentum when moving the scanner to automatically lock up the chassis. Whenever the momentum arises, the shock lockup apparatus is able to automatically fix the chassis 16 in time to avoid damage. When the momentum disappears, the shock lockup mechanism will be released and the chassis 16 will become movable again. It is more convenient for the user as there is no need to release the shock lockup mechanism by any manual operation.

Although the present invention has been disclosed and illustrated with reference to the preferred embodiments, the principles involved can be applied for use in numerous other embodiments that will be apparent to persons skilled in the art. The present invention is, therefore, to be limited only as indicated by the scope of the appended claims.

What is claimed is:

1. A chassis shock lockup apparatus for an image scanning device, which is mounted on the outside bottom surface of a chassis and is opposite to a transmission belt that drives the chassis, and wherein the chassis shock lockup apparatus comprising:

a stopping block mounted on the outside bottom surface of the chassis, which is opposite to the first side of the transmission belt; and a lockup module mounted on the outside bottom surface of the chassis, which is opposite to the second side of the transmission belt and said stopping block; said lockup module includes at least one locking unit and an elastic unit, said elastic unit assemble with said at least one lockup unit;

Wherein the chassis receives momentum, said locking unit of said lockup module moves relatively toward said stopping block to nip the transmission belt and thus fixate the chassis; in such a manner, said elastic unit deforms to generate resilience and drives said locking unit back to original position when the momentum disappears.

2. The chassis shock lockup apparatus for an image scanning device as claimed in claim 1, wherein said locking unit assemble with at least one guiding pin, at least one curved groove is formed on the outside bottom surface of the chassis, such that the curved groove allow the guiding pin move by the anticipated trajectory.

3. The chassis shock lockup apparatus for an image scanning device as claimed in claim 1, wherein said elastic unit of said lockup module is a torsion spring, and said locking unit includes two rollers, wherein the center of said torsion spring is mounted on the outside bottom surface of the chassis, said two rollers are assembled to the two ends of said torsion spring respectively.

4. The chassis shock lockup apparatus for an image scanning device as claimed in claim 3, wherein each of said two rollers having an axle, the axle is rested on the end of said torsion spring.

5. The chassis shock lockup apparatus for an image scanning device as claimed in claim 1, wherein said lockup unit of said lockup module is a V-shaped swaying block which is defined a pivot position and two extending arms are formed at both side of the pivot position respectively, and the end of the extending arm is formed a locking end; said elastic unit is a torsion spring, the center of said torsion spring and the pivot position of said swaying block are rested upon together, and the two ends of said torsion spring rest upon the locking ends of said swaying block, said swaying block and said torsion spring are pivoted on the outside bottom surface of the chassis.

6. The chassis shock lockup apparatus for an image scanning device as claimed in claim 5, wherein the two locking ends assemble two outstanding rods with guiding pins respectively, and the two ends of said torsion spring rest upon the two outstanding rods respectively.

7. The chassis shock lockup apparatus for an image scanning device as claimed in claim 1, wherein said stopping block having two saliencies on surface, and the two saliencies are opposite to the first side of the transmission belt.

8. The chassis shock lockup apparatus for an image scanning device as claimed in claim 1, wherein said stopping block or said locking unit which is made of soft material.

9. The chassis shock lockup apparatus for an image scanning device as claimed in claim 8, wherein the soft material is rubber or sponge alike.

10. A chassis shock lockup apparatus for an image scanning device, which is mounted on the outside bottom surface of a chassis and is opposite to a transmission belt that drives the chassis, and wherein the chassis shock lockup apparatus comprising:
    a stopping block mounted on the outside bottom surface of the chassis, which is opposite to the first side of the transmission belt; and
    a lockup module comprises two rollers and a torsion spring, the center of said torsion spring is mounted on the outside bottom surface of the chassis, said rollers are assembled with the two ends of said torsion spring respectively, and said rollers are opposite to the second side of the transmission belt and said stopping block;
    wherein the chassis receives momentum, one of said rollers moves toward said stopping block to nip the transmission belt and thus fixate the chassis by inertia; in such a manner, said torsion spring deforms to generate resilience and drives said locking unit back to original position when the momentum disappears.

11. The chassis shock lockup apparatus for an image scanning device as claimed in claim 10, wherein said two rollers assemble a guiding pin respectively; two curved grooves are formed on the outside bottom surface of the chassis, such that the curved grooves allow the guiding pins move by the anticipated trajectory.

12. The chassis shock lockup apparatus for an image scanning device as claimed in claim 10, wherein each of said two rollers having an axle, the axle is rested on the end of said torsion spring.

13. The chassis shock lockup apparatus for an image scanning device as claimed in claim 10, wherein said stopping block having two saliencies which are opposite to the first side of the transmission belt.

14. The chassis shock lockup apparatus for an image scanning device as claimed in claim 10, wherein said stopping block or said locking unit which is made of soft material.

15. The chassis shock lockup apparatus for an image scanning device as claimed in claim 14, wherein the soft material is rubber or sponge alike.

16. A chassis shock lockup apparatus for an image scanning device, which is mounted on the outside bottom surface of a chassis and is opposite to a transmission belt that drives the chassis, and wherein the chassis shock lockup apparatus comprising:
    a stopping block mounted on the outside bottom surface of the chassis, which is opposite to the first side of the transmission belt; and
    a lockup module includes a swaying block and a torsion spring, said swaying block is defined a pivot position and two extending arms are formed at both side of the pivot position respectively, and the end of the extending arm is formed a locking end; said torsion spring is assembled with said swaying block, two end of said torsion spring are rested upon the locking ends respectively, wherein the assembly of said torsion spring and said swaying block is pivoted on the outside bottom surface of the chassis, the locking ends are opposite to the second side of the transmission belt and said stopping block;
    wherein the chassis receives momentum, one end of said swaying block moves toward said stopping block to nip the transmission belt and thus fixate the chassis by inertia; in such a manner, said torsion spring deforms to generate resilience and drives said locking unit back to original position when the momentum disappears.

17. The chassis shock lockup apparatus for an image scanning device as claimed in claim 16, wherein said swaying block is a V-shaped block and are formed two extending arms at both side respectively.

18. The chassis shock lockup apparatus for an image scanning device as claimed in claim 16, wherein each of the extending arms of said swaying block is assembled with an outstanding rod which close to the locking end.

19. The chassis shock lockup apparatus for an image scanning device as claimed in claim 16, wherein each of the extending arms is assembled a guiding pin; two curved grooves are formed on the outside bottom surface of the chassis, such that the curved grooves allow the guiding pins move by the anticipated trajectory.

20. The chassis shock lockup apparatus for an image scanning device as claimed in claim 16, wherein said stopping block having two saliencies which are opposite to the first side of the transmission belt.

21. The chassis shock lockup apparatus for an image scanning device as claimed in claim 16, wherein said stopping block or said locking unit which is made of soft material.

22. The chassis shock lockup apparatus for an image scanning device as claimed in claim 21, wherein the soft material is rubber or sponge alike.

* * * * *